United States Patent
Bhatia et al.

(10) Patent No.: US 11,762,885 B2
(45) Date of Patent: Sep. 19, 2023

(54) SYSTEM AND METHOD FOR IDENTIFYING SEMANTIC SIMILARITY

(71) Applicant: Tata Consultancy Services Limited, Mumbai (IN)

(72) Inventors: Gurpriya Kaur Bhatia, Pune (IN); Kumar Mansukhlal Vidhani, Pune (IN); Mangesh Sharad Gharote, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 128 days.

(21) Appl. No.: 17/447,613

(22) Filed: Sep. 14, 2021

(65) Prior Publication Data

US 2022/0147545 A1 May 12, 2022

(30) Foreign Application Priority Data

Nov. 6, 2020 (IN) .............................. 202021048607

(51) Int. Cl.
*G06F 16/28* (2019.01)
(52) U.S. Cl.
CPC .......... *G06F 16/288* (2019.01); *G06F 16/285* (2019.01)
(58) Field of Classification Search
CPC .............................. G06F 16/288; G06F 16/285
See application file for complete search history.

(56) References Cited

U.S. PATENT DOCUMENTS

| 2003/0093275 A1* | 5/2003 | Polanyi | G09B 17/003 |
| | | | 704/E15.045 |
| 2008/0275694 A1* | 11/2008 | Varone | G06F 40/30 |
| | | | 704/9 |
| 2014/0258301 A1* | 9/2014 | Misra | G06F 16/36 |
| | | | 707/739 |

(Continued)

OTHER PUBLICATIONS

Xie, Feng, "TST: Threshold Based Similarity Transitivity Method in Collaborative Filtering with Cloud Computing", ISSN, Jun. 2013, vol. 18, No. 3, pp. 318-327, IEEE, https://ieeexplore.ieee.org/stamp/stamp.jsp?arnumber=6522590.

*Primary Examiner* — Mark D Featherstone
*Assistant Examiner* — Brooks T Hale
(74) *Attorney, Agent, or Firm* — Finnegan, Henderson, Farabow, Garrett & Dunner LLP (57) ABSTRACT

Protecting consumer data is a key responsibility of an organization. The method of protection need to compare the data with policy documents. Ontology and a threshold to select an optimal match plays a key role in such comparison. The conventional automatic threshold computation methods are complex and not based on semantic similarity. The present disclosure generates an Entity Relationship (ER) model from an input document and is converted into a first ontology. The first ontology and a second ontology obtained from a relational database are compared by an ontology matching algorithm. Further, the plurality of many to many correspondences are optimized to one to one correspondence by an optimization method. Further, a plurality of optimal one to one correspondence is generated based on a threshold. The threshold is computed based on symmetric and transitive property. Further, semantically similar entities are selected based on the optimal one to one correspondence.

20 Claims, 7 Drawing Sheets

(56) References Cited

U.S. PATENT DOCUMENTS

| | | | |
|---|---|---|---|
| 2014/0350913 A1* | 11/2014 | Cheng | G06F 40/20 704/2 |
| 2015/0206090 A1* | 7/2015 | Pakhchanyan | G06F 3/04895 705/7.42 |
| 2016/0110657 A1* | 4/2016 | Gibiansky | G06N 20/00 706/12 |

* cited by examiner

Symmetric

FIG. 3C

Transitive

SYSTEM AND METHOD FOR IDENTIFYING SEMANTIC SIMILARITY

PRIORITY CLAIM

This U.S. patent application claims priority under 35 U.S.C. § 119 to: India Application No. 202021048607, filed on Nov. 6, 2020. The entire contents of the aforementioned application are incorporated herein by reference.

TECHNICAL FIELD

The disclosure herein generally relates to the field of text processing and, more particular, to a method and system for identifying semantic similarity.

BACKGROUND

Organizations depend on consumers data for various business purposes and protecting the consumer data is a key task of the organization due to data theft. The consumers data can be sensitive or non-sensitive in nature. To provide data privacy, governments have responded by enacting various data privacy laws and organizations in turn implement various data privacy and security policies. In order to check whether a document includes sensitive data, it needs to be compared with a corresponding policy document. Ontology matching plays a major role in comparing one or more textual descriptions and to identify semantically similar entities. A threshold applied in selecting the semantically similar entities between one or more textual descriptions plays a major role in identifying sensitive data from the textual description.

Conventional methods utilize ontology matching algorithms where threshold is computed manually or in a semi-automatic manner. Some methods use automated approach too. In the semi-automatic approach, a user needs to confirm a correspondence based on an initial threshold value. Based on the user decision, the threshold is upgraded. The conventional automatic methods compute threshold using k-means clustering and fuzzy logic approaches. However, the conventional automatic threshold computation methods are complex, ad-hoc in nature and some of them are forced fit for the ontology matching task. Hence it is challenging to identify semantically similar entities accurately based on a threshold.

SUMMARY

Embodiments of the present disclosure present technological improvements as solutions to one or more of the above-mentioned technical problems recognized by the inventors in conventional systems. For example, in one embodiment, a method for identifying semantic similarity is provided. The method includes a receiving by one or more hardware processors at least one text description comprising a plurality of sentences. Further, the method includes extracting, by the one or more hardware processors, a plurality of entities and a plurality of relationship between each of the plurality of entities from the plurality of sentences. Further, the method includes generating, by the one or more hardware processors, an Entity Relationship (ER) model based on the plurality of entities and the plurality of relationship between each of the plurality of entities. Furthermore, the method includes converting, by the one or more hardware processors, the ER model into a first ontology based on a first set of predefined rules. Furthermore, the method includes performing a comparison of the first ontology with a second ontology, by the one or more hardware processors, to obtain a plurality of many to many ontology alignments by an ontology matching algorithm, wherein the second ontology is obtained from a relational database based on a second set of predefined rules. Furthermore, the method includes computing, by the one or more hardware processors, a confidence value for each of the plurality of many to many ontology alignments by the ontology matching algorithm. Furthermore, the method includes obtaining, by the one or more hardware processors, a plurality of one to one correspondences based on the plurality of many to many ontology alignments by a linear optimization algorithm, wherein the one to one correspondence is a pair of semantically similar entities. Furthermore, the method includes selecting, by the one or more hardware processors, one or more optimal one to one correspondences based on a pre-determined threshold, wherein the pre-determined threshold is computed by (i) receiving the plurality of one to one correspondences, wherein each of the plurality of one to one correspondences is associated with a confidence value (ii) computing a reverse confidence value for each of the plurality of one to one correspondences (iii) computing a symmetric difference value between the confidence value and the reverse confidence value associated with each of the plurality of one to one correspondence (iv) generating a plurality of symmetric correspondence pairs based on the computed symmetric difference value (v) generating a plurality of transitive correspondence based on the plurality of symmetric correspondences and the predetermined difference value (vi) selecting a plurality of threshold correspondences from the plurality of transitive correspondences when the number of transitive correspondences is equal to half of the corresponding reference confidence value (vii) comparing the confidence value of each of the plurality of threshold correspondences with a highest confidence value to obtain a plurality of final difference values, wherein the highest confidence value is selected from corresponding confidence values of the plurality of threshold correspondences (viii) selecting a plurality of final correspondences from the plurality of threshold correspondences based on the corresponding plurality of final difference values and (ix) computing a mean value of the plurality of final correspondences to obtain the pre-determined threshold value. Furthermore, the method includes obtaining, by the one or more hardware processors, a plurality of semantically similar entities based on the one or more optimal one to one correspondences, wherein an optimal one to one correspondence of a pair of entities from the first ontology and the second ontology are semantically similar.

In another aspect, a system for identifying semantic similarity is provided. The system includes at least one memory storing programmed instructions, one or more Input/Output (I/O) interfaces, and one or more hardware processors operatively coupled to the at least one memory, wherein the one or more hardware processors are configured by the programmed instructions to receive at least one text description comprising a plurality of sentences. Further, the one or more hardware processors are configured by the programmed instructions to extract a plurality of entities and a plurality of relationship between each of the plurality of entities from the plurality of sentences. Furthermore, the one or more hardware processors are configured by the programmed instructions to generate an Entity Relationship (ER) model based on the plurality of entities and the plurality of relationship between each of the plurality of entities. Furthermore, the one or more hardware processors are configured by the programmed instructions to convert the ER model into a first ontology based on a first set of predefined rules. Furthermore, the one or more hardware processors are configured by the programmed instructions to perform a comparison of the first ontology with a second ontology, by the one or more hardware processors, to obtain a plurality of many to many ontology alignments by an ontology matching algorithm, wherein the second ontology is obtained from a relational database based on a second set of predefined rules Furthermore, the one or more hardware processors are configured by the programmed instructions to compute a confidence value for each of the plurality of many to many ontology alignments by the ontology matching algorithm. Furthermore, the one or more hardware processors are configured by the programmed instructions to obtain a plurality of one to one correspondence based on the plurality of many to many ontology alignments by a linear optimization algorithm, wherein the one to one correspondence is a pair of semantically similar entities. Furthermore, the method includes selecting, by the one or more hardware processors, one or more optimal one to one correspondences based on a pre-determined threshold, wherein the pre-determined threshold is computed by (i) receiving the plurality of one to one correspondences, wherein each of the plurality of one to one correspondences is associated with a confidence value (ii) computing a reverse confidence value for each of the plurality of one to one correspondences (iii) computing a symmetric difference value between the confidence value and the reverse confidence value associated with each of the plurality of one to one correspondence (iv) generating a plurality of symmetric correspondence pairs based on the computed symmetric difference value (v) generating a plurality of transitive correspondence based on the plurality of symmetric correspondences and the predetermined difference value (vi) selecting a plurality of threshold correspondences from the plurality of transitive correspondences when the number of transitive correspondences is equal to half of the corresponding reference confidence value (vii) comparing the confidence value of each of the plurality of threshold correspondences with a highest confidence value to obtain a plurality of final difference values, wherein the highest confidence value is selected from corresponding confidence values of the plurality of threshold correspondences (viii) selecting a plurality of final correspondences from the plurality of threshold correspondences based on the corresponding plurality of final difference values and (ix) computing a mean value of the plurality of final correspondences to obtain the pre-determined threshold value. Finally, the one or more hardware processors are configured by the programmed instructions to obtain a plurality of semantically similar entities based on the one or more optimal one to one correspondences, wherein an optimal one to one correspondence of a pair of entities from the first ontology and the second ontology are semantically similar.

In yet another aspect, a computer program product including a non-transitory computer-readable medium having embodied therein a computer program for identifying semantic similarity is provided. The computer readable program, when executed on a computing device, causes the computing device to receive at least one text description including a plurality of sentences. Further, the computer readable program, when executed on a computing device, causes the computing device to extract a plurality of entities and a plurality of relationship between each of the plurality of entities from the plurality of sentences. Furthermore, the computer readable program, when executed on a computing device, causes the computing device to generate an Entity Relationship (ER) model based on the plurality of entities and the plurality of relationship between each of the plurality of entities. Furthermore, the computer readable program, when executed on a computing device, causes the computing device to convert the ER model into a first ontology based on a first set of predefined rules. Furthermore, the computer readable program, when executed on a computing device, causes the computing device to perform a comparison of the first ontology with a second ontology, by the one or more hardware processors, to obtain a plurality of many to many ontology alignments by an ontology matching algorithm, wherein the second ontology is obtained from a relational database based on a second set of predefined rules. Furthermore, the computer readable program, when executed on a computing device, causes the computing device to compute a confidence value for each of the plurality of many to many ontology alignments by the ontology matching algorithm. Furthermore, the computer readable program, when executed on a computing device, causes the computing device to obtain a plurality of one to one correspondences based on the plurality of many to many ontology alignments by a linear optimization algorithm, wherein the one to one correspondence is a pair of semantically similar entities. Furthermore, the method includes selecting, by the one or more hardware processors, one or more optimal one to one correspondences based on a pre-determined threshold, wherein the pre-determined threshold is computed by (i) receiving the plurality of one to one correspondences, wherein each of the plurality of one to one correspondences is associated with a confidence value (ii) computing a reverse confidence value for each of the plurality of one to one correspondences (iii) computing a symmetric difference value between the confidence value and the reverse confidence value associated with each of the plurality of one to one correspondence (iv) generating a plurality of symmetric correspondence pairs based on the computed symmetric difference value (v) generating a plurality of transitive correspondence based on the plurality of symmetric correspondences and the predetermined difference value (vi) selecting a plurality of threshold correspondences from the plurality of transitive correspondences when the number of transitive correspondences is equal to half of the corresponding reference confidence value (vii) comparing the confidence value of each of the plurality of threshold correspondences with a highest confidence value to obtain a plurality of final difference values, wherein the highest confidence value is selected from corresponding confidence values of the plurality of threshold correspondences (viii) selecting a plurality of final correspondences from the plurality of threshold correspondences based on the corresponding plurality of final difference values and (ix) computing a mean value of the plurality of final correspondences to obtain the pre-determined threshold value. Finally, the computer readable program, when executed on a computing device, causes the computing device to obtain a plurality of semantically similar entities based on the one or more optimal one to one correspondences, wherein an optimal one to one correspondence of a pair of entities from the first ontology and the second ontology are semantically similar.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for identifying semantic similarity. The method and system identify semantically similar entities accurately by comparing two ontologies. The method receives at least one text description. The at least one text description is cleaned for noise and complex sentences are converted into simple sentences. Further, a plurality of entities and a plurality of relationship among each of the plurality of entities are extracted from a plurality of simple sentences. An Entity Relationship (ER) model is constructed from the plurality of entities and plurality of relations between entities. The ER model is converted into a first ontology. Similarly, a second ontology is constructed based on a relational database. The first ontology and the second ontology are compared by an ontology matching algorithm. The ontology matching algorithm computes a plurality of many to many correspondences between each entity from the first ontology and the second ontology and a corresponding confidence value. Further, the plurality of many to many correspondences are optimized to one to one correspondence by an optimization method. Further, a plurality of optimal one to one correspondence is generated based on a threshold. The threshold is computed based on symmetric and transitive properties of a plurality of one to one correspondences. Finally, a plurality of semantically similar entities are obtained based on the one or more optimal one to one correspondences. An optimal one to one correspondence of a pair of entities from the first ontology and the second ontology are semantically similar.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
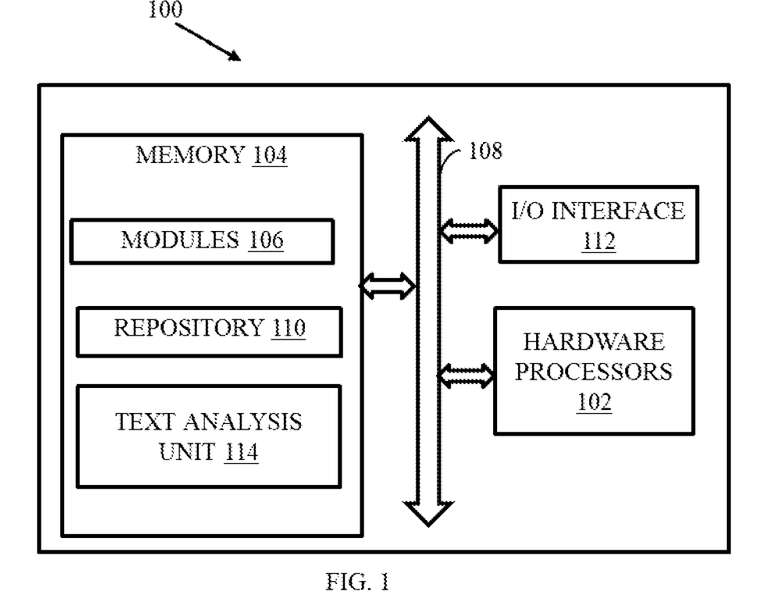
FIG. 1 is a functional block diagram of a system for identifying semantic similarity, according to some embodiments of the present disclosure.

FIG. 1 is a functional block diagram of a system 100 for identifying semantic similarity, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The I/O interface 112 may include one or more ports for connecting a number of devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and a text analysis unit 114. The memory 104 also includes a data repository (or repository) 110 for storing data processed, received, and generated by the plurality of modules 106 and the text analysis unit 114.

The plurality of modules 106 include programs or coded instructions that supplement applications or functions performed by the system 100 for identifying semantic similarity. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for identifying semantic similarity.

The data repository (or repository) 110 may include a plurality of abstracted piece of code for refinement and data that is processed, received, or generated as a result of the execution of the plurality of modules in the module(s) 106 and the modules associated with text analysis unit 114. In an embodiment, modules such as an ER model generation module, an ER model to first ontology conversion module, many to many alignment computation module, an one to one correspondence computation module, an optimal one to one correspondence module and a semantic similarity generation module are present inside text analysis unit 114. The data repository may also include ER models and ontologies associated with the method for identifying semantic similarity.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
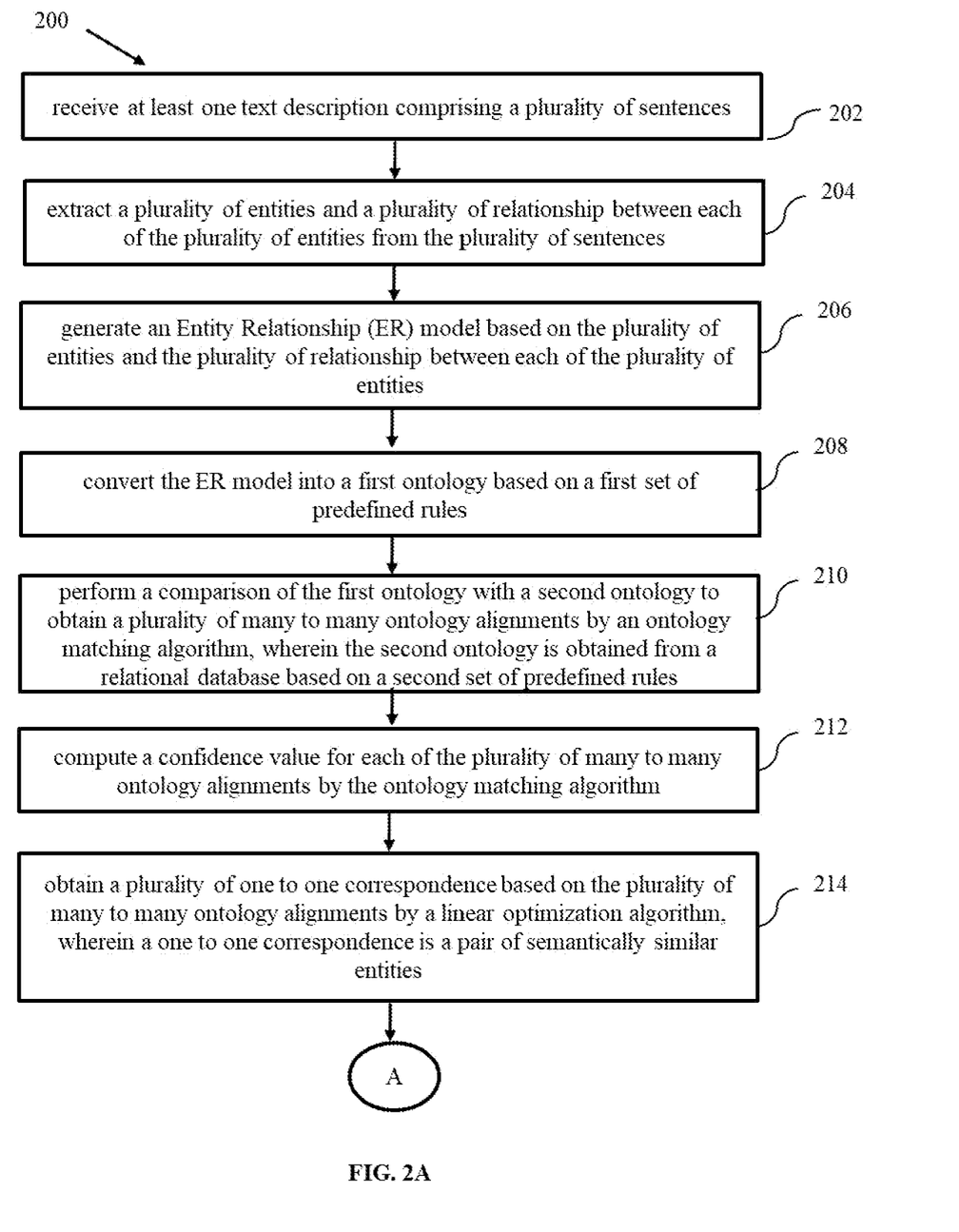
FIGS. 2A and 2B are exemplary flow diagrams for a method for identifying semantic similarity implemented by the system of FIG. 1, in accordance with some embodiments of the present disclosure.
Figure 2B:
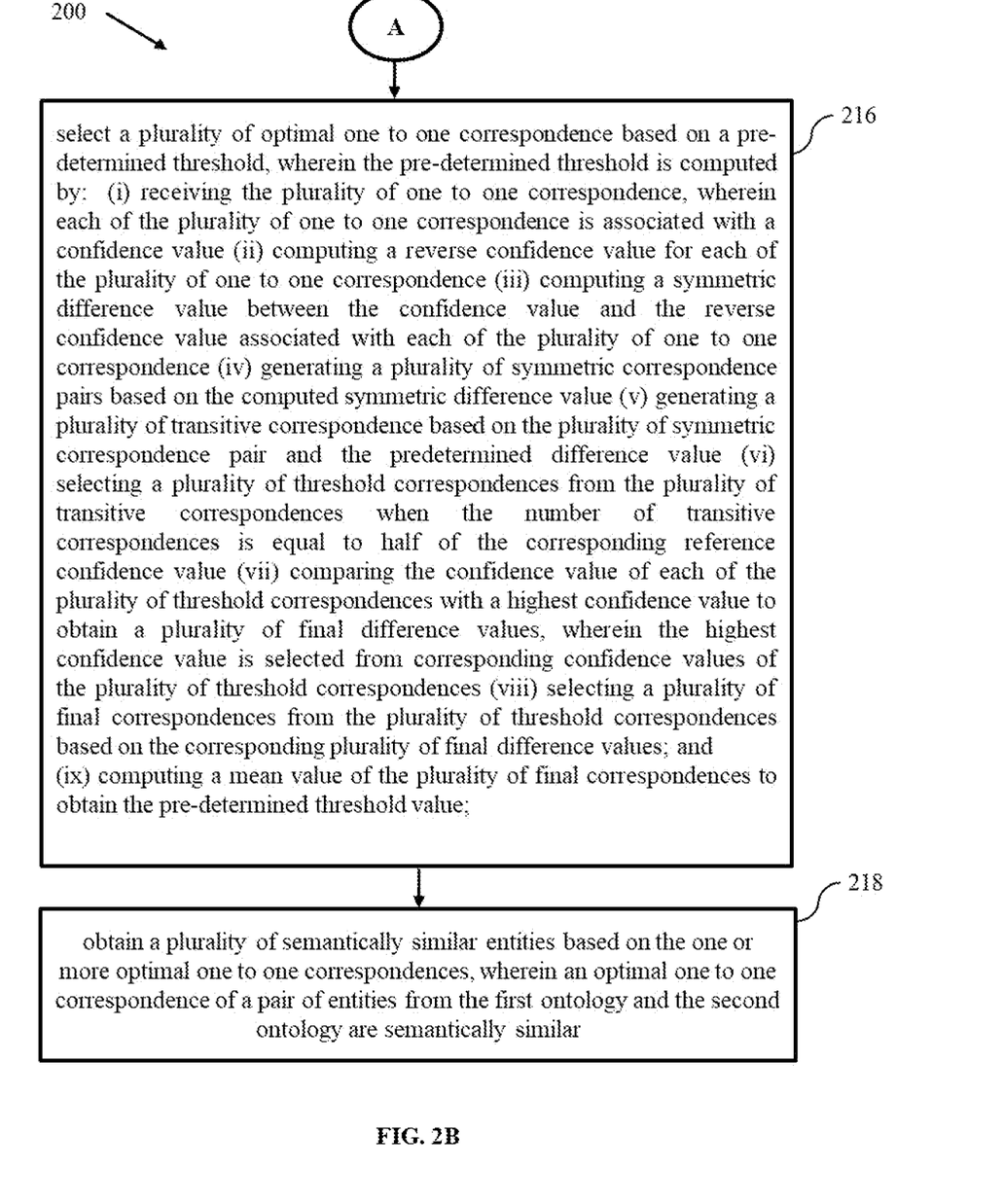

FIGS. 2A and 2B are exemplary flow diagrams for a processor implemented method for identifying semantic similarity implemented by the system of FIG. 1A and FIG. 1B according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 108 receive a text description comprising a plurality of sentences. The text description is cleaned for noise. Further, the plurality of sentences are simplified.

For example, the text description can be the following plurality of sentences "An Indian chapter of technical education society is going to organize a conference on data analytics in the month of November. We solicit original contributions from researchers and engineers for the conference in the field of data analytics but not limited to only this topic. Researchers and engineers can submit two types of papers: 4 pages and 8 pages. The 4 pages long paper are aimed at giving a high-level solution while 8 pages long paper should describe the complete system in detail. Every paper will be reviewed by at least three reviewers. Acceptance of paper will be notified two months post its submission to the conference website. If a paper is accepted, one of its authors must register for the conference and present it"

At step 204 of the method 200, the one or more hardware processors 108 extract a plurality of entities and a plurality of relationship between each of the plurality of entities from the plurality of sentences.

For example, the plurality of entities extracted from the above text description includes 'society', 'Indian chapter', 'conference', 'topic', 'paper', 'reviewer', 'acceptance', 'conference website' and the like.

For example, the plurality of extracted relationship between entities are 'reviewer-review-paper', 'society-organize-conference', 'paper-submit-conference website' and the like.

At step 206 of the method 200, the one or more hardware processors 108 generate an Entity Relationship (ER) model based on the plurality of entities and the plurality of relationship between each of the plurality of entities.

At step 208 of the method 200, the one or more hardware processors 108 convert the ER model into a first ontology based on a first set of predefined rules. For example, the set of predefined rules includes (i) mapping of an entity to an ontology class and (ii) mapping of a relationship between entities to an object property.

At step 210 of the method 200, the one or more hardware processors 108 perform a comparison of the first ontology with a second ontology to obtain a plurality of many to many ontology alignments by an ontology matching algorithm. The second ontology is obtained from a relational database based on a second set of predefined rules.

Figure 3A:
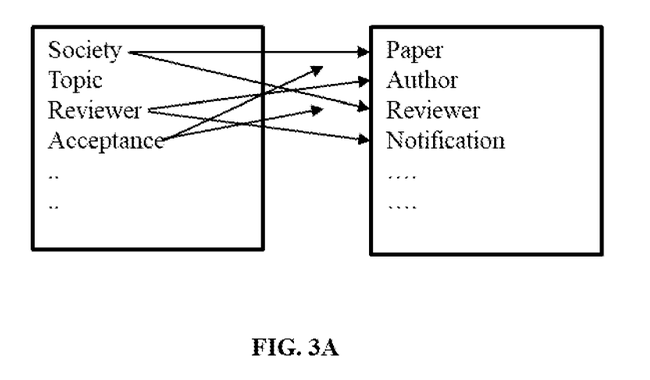
FIGS. 3A and 3B illustrates examples of many to many and one to one ontology alignments respectively implemented by the system of FIG. 1, in accordance with some embodiments of the present disclosure.
Figure 3B:
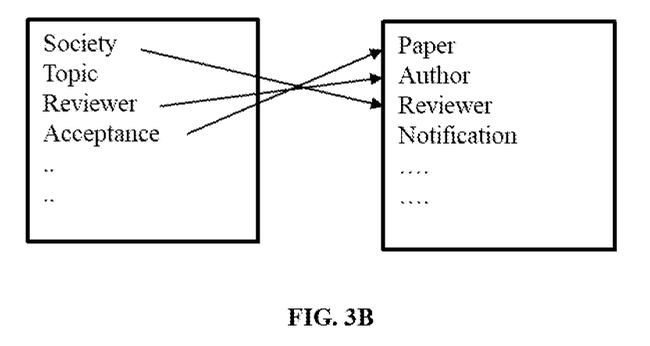

FIGS. 3A and 3B illustrates examples of many to many and one to one ontology alignments respectively, in accordance with some embodiments of the present disclosure. Now referring to FIG. 3A, the entity 'society' is having alignments to 'paper' and reviewer. The entity 'reviewer' is having the alignments 'author' and 'notification'.

At step 212 of the method 200, the one or more hardware processors 108 compute a confidence value for each of the plurality of many to many ontology alignments by the ontology matching algorithm.

At step 214 of the method 200, the one or more hardware processors 108 obtain a plurality of one to one correspondences based on the plurality of many to many ontology alignments by a linear optimization algorithm, wherein a one to one correspondence is a pair of semantically similar entities. For example, the confidence value between the entities 'author' and 'reviewer' is 0.52. The confidence value between 'author' and 'paper' is 0.5 and the like. Now referring to FIG. 3B, the entity 'society' is having one to one correspondence with the entity 'reviewer', the entity 'reviewer' is having one to one correspondence with the entity 'author' and the like.

At step 216 of the method 200, the one or more hardware processors 108 select a plurality of optimal one to one correspondence based on a pre-determined threshold. The pre-determined threshold is computed by using the following method steps: (i) receiving the plurality of one to one correspondences. The plurality of one to one correspondences are associated with a confidence value (ii) computing a reverse confidence value for each reverse pair of the plurality of one to one correspondences (iii) computing a symmetric difference value between the confidence value and the reverse confidence value associated with each of the plurality of one to one correspondences (iv) generating a plurality of symmetric correspondences pairs based on the computed symmetric difference value. The plurality of one to one correspondence with the difference value less than a predetermined difference value are selected (v) generating a plurality of transitive correspondences based on the plurality of symmetric correspondences and the predetermined difference value (vi) selecting a plurality of threshold correspondences from the plurality of transitive correspondences when the number of transitive correspondences is equal to half of the corresponding reference correspondences (vii) Selecting a highest confidence value from the plurality of threshold correspondences (viii) comparing the confidence value of each of the plurality of threshold correspondences and the highest confidence value to obtain a plurality of final difference values (ix) selecting a plurality of final correspondences based on the corresponding plurality of final difference values. Each of the plurality of threshold correspondences with a corresponding final difference value less than or equal to the predetermined difference value are selected and (x) computing a mean value of the plurality of final correspondences to obtain the pre-determined threshold value.

Figure 3C:
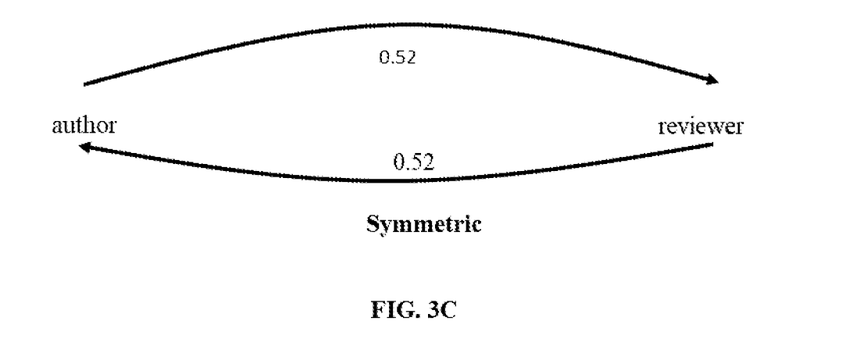
FIG. 3C and FIG. 3D illustrates example symmetric correspondence and the transitive correspondences respectively implemented by the system of FIG. 1, according to some embodiments of the present disclosure.
Figure 3D:
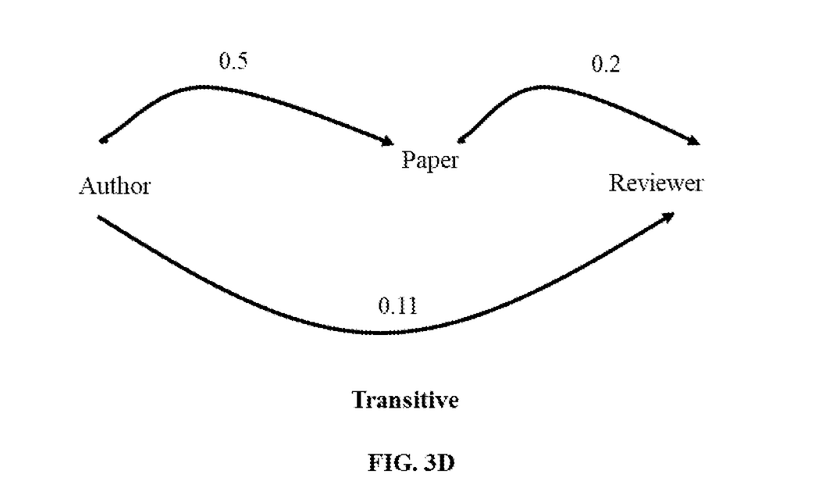

FIG. 3C and FIG. 3D, illustrates the symmetric correspondence and the transitive correspondence of a set of example entities respectively, according to some embodiments of the present disclosure. Now referring to FIG. 3C, the confidence value between the entities 'author' and 'reviewer' is 0.52. Similarly, the reverse confidence value between the entities 'reviewer' and 'author' is 0.52. Hence, the entities 'author' and 'reviewer' are satisfying transitive property. Now referring to FIG. 3D, the confidence value between the entities 'author' and 'paper' is 0.5 and the confidence value between the entities 'paper' and 'reviewer' is 0.2 Hence, the confidence value between the entities 'author' and 'reviewer' is 0.11. This illustrates the transitive property.

At step 218 of the method 200, the one or more hardware processors 108 obtains a plurality of semantically similar entities based on the one or more optimal one to one correspondences. An optimal one to one correspondence of a pair of entities from the first ontology and the second ontology are semantically similar. For example, referring to FIG. 3B, the entities 'reviewer' and 'author' are semantically similar. As a general example, an entity 'truck' is semantically similar to an entity 'lorry'.

Figure 4:
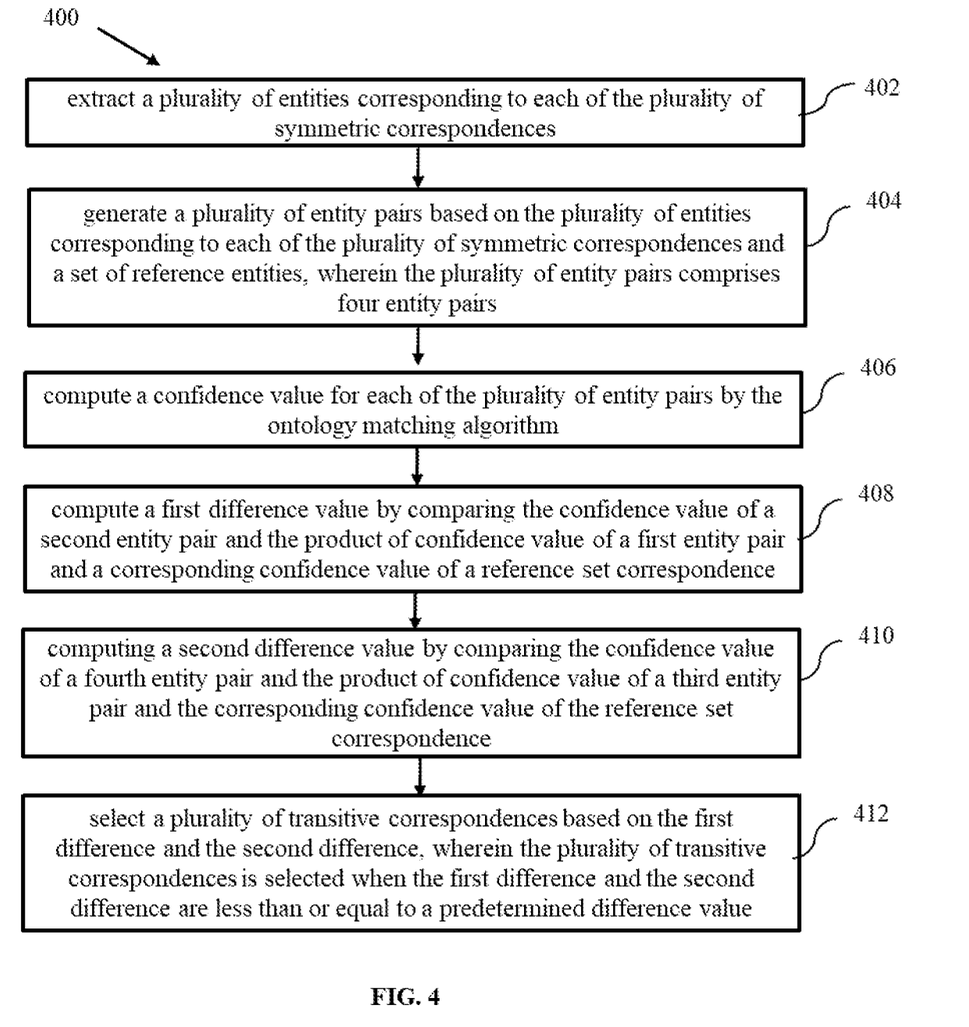
FIG. 4 is an exemplary flow diagram for a method for generating a plurality of transitive correspondence for the method for identifying semantic similarity implemented by the system of FIG. 1, in accordance with some embodiments of the present disclosure.

FIG. 4 is an exemplary flow diagram for a method for generating a plurality of transitive correspondence for the method for identifying semantic similarity identifying semantic similarity identifying semantic similarity identifying semantic similarity implemented by the system of FIG. 1, in accordance with some embodiments of the present disclosure. At step 402 of the method 400, the one or more hardware processors 108 extract a plurality of entities corresponding to each of the plurality of symmetric correspondences. At step 404 of the method 400, the one or more hardware processors 108 generate a plurality of entity pairs based on the plurality of entities corresponding to each of the plurality of symmetric correspondences and a set of reference entities. In an embodiment, the plurality of entity pairs comprises four entity pairs. At step 406 of the method 400, the one or more hardware processors 108 compute a confidence value for each of the plurality of entity pairs by the ontology matching algorithm. At step 408 of the method 400, the one or more hardware processors 108 compute a first difference value by comparing the confidence value of a second entity pair and the product of confidence value of a first entity pair and a corresponding confidence value of a reference set correspondence. At step 410 of the method 400, the one or more hardware processors 108 compute a second difference value by comparing the confidence value of a fourth entity pair and the product of confidence value of a third entity pair and the corresponding confidence value of a reference set correspondence. At step 412 of the method 400, the one or more hardware processors 108 select a plurality of transitive correspondences based on the first difference value and the second difference value. The plurality of transitive correspondences is selected when the first difference and the second difference are less than or equal to a predetermined difference value.

Figure 5:
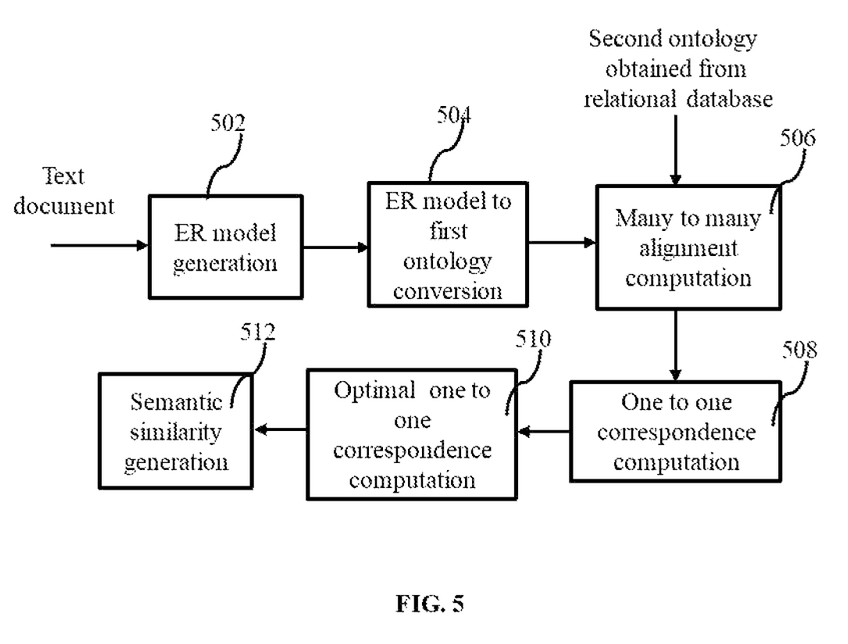
FIG. 5 illustrates an overall architecture illustrating the method for identifying semantic similarity, in accordance with some embodiments of the present disclosure.

FIG. 5 illustrates an overall architecture illustrating the method for identifying semantic similarity, in accordance with some embodiments of the present disclosure.

Now referring to FIG. 5, the method for identifying semantic similarity from the document includes an ER model generation module 502 (explained in step 204 of FIG. 2A) which receives the plurality of entities and the plurality of relationships between each of the plurality of entities and generates the ER model. Here, the plurality of sentences associated with the document are cleaned and converted into simple sentences before extracting the plurality of entities and the plurality of relationships between each of the plurality of entities. Further, the ER model is converted into a first ontology by ER model to first ontology conversion module 504 (explained in step 208 of FIG. 2A). Further, the many to many alignment computation module 506 (explained in step 210 of FIG. 2A) receives the first ontology and the second ontology and computes the plurality of many to many correspondences and the corresponding confidence value. Further, the one to one correspondence computation module 508 (explained in step 214 of FIG. 2A) computes the plurality of one to one correspondences by using the optimization algorithm. For example, the optimization algorithm can be one of an Integer Programming, a Hill Climbing algorithm, a Simulated Annealing method and an Ant colony optimization algorithm and the like. Further, the optimal one to one correspondence computation module 510 (explained in step 216 of FIG. 2B) computes the optimal one to one correspondence based on the threshold. The threshold is computed based on the symmetric and transitive property of the entities. The semantic similarity generation module 512 obtains a plurality of semantically similar entities based on the one or more optimal one to one correspondences. An optimal one to one correspondence of a pair of entities from the first ontology and the second ontology are semantically similar.

The text analysis unit 114, when executed by one or more processors of the system 100 receive the text description including the plurality of sentences. The plurality of sentences are cleaned for noise. Further, the plurality of sentences are simplified.

Further, the text analysis unit 114, when executed by one or more processors of the system 100, extract the plurality of entities and the plurality of relationship between each of the plurality of entities from the plurality of sentences.

Further, the text analysis unit 114, when executed by one or more processors of the system 100, generate the Entity Relationship (ER) model based on the plurality of entities and the plurality of relationship between each of the plurality of entities.

Further, the text analysis unit 114, when executed by one or more processors of the system 100, convert the ER model into the first ontology based on the first set of predefined rules.

Further, the text analysis unit 114, when executed by one or more processors of the system 100, perform the comparison of the first ontology with the second ontology to obtain the plurality of many to many ontology alignments by the ontology matching algorithm. The second ontology is obtained from the relational database based on the second set of predefined rules.

In an embodiment, the ontology matching algorithm first generates a set (O1×O2) of correspondences between two ontologies, called ontology alignment, in the form of quadruples <e1,e2,r,cnf> for given input ontologies O1 (first ontology) and O2 (second ontology). Variables e1 and e2 represent entities belonging to ontologies O1 and O2 respectively, the variable r represents the relationship between entities and the variable cnf∈[0,1] represents the confidence value computed by ontology matching algorithm. Final alignment is produced by specifying threshold on the confidence values. Typically, threshold estimation has been largely manual and human driven approach.

In an embodiment, a pair of ontologies O1 and O2 are considered. The ontology matching algorithm $OM_{algo}$ generates a set of correspondences. Each correspondence is denoted by <$e_i,e_j$,r,cnf> where $e_i \in O1$ and $e_j \in O2$ r is relation between $e_i$ and $e_j$, cnf is confidence value computed by $OM_{algo}$ where cnf∈[0,1]. F is the similarity function used by $OM_{algo}$ which computes the confidence value between two entities. i.e., $F(e_i,e_j)$=cnf.

In an embodiment, an ontology matching algorithm $OM_{algo}$ is said to exhibit consistency in confidence value computation property if the similarity function F computes the same value for every pair <$e_i,e_j$>∈O1×O2 and its reverse pair <$e_j,e_i$> as given in equation 1.

$$\forall i,j, |F(e_i,e_j)-F(e_j,e_i)|=0, 1 \leq i \leq |O1|, 1 \leq j \leq |O2| \quad (1)$$

The ontology matching algorithm $OM_{algo}$ is said to exhibit consistency in confidence value computation property if the confidence values computed for every pair <$e_i$, $e_j$>∈O1×O2 and its reverse pair <$e_j,e_i$> by similarity function F differ at most by δ as given in equation 2.

$$\forall i,j, |F(e_i,e_j)-F(e_j,e_i)|<\delta, 1 \leq i \leq |O1|, 1 \leq j \leq |O2| \quad (2)$$

Further, the text analysis unit 114, when executed by one or more processors of the system 100, compute the confidence value for each of the plurality of many to many ontology alignments by the ontology matching algorithm.

Further, the text analysis unit 114, when executed by one or more processors of the system 100, obtain the plurality of one to one correspondence based on the plurality of many to many ontology alignments by the linear optimization algorithm. The one to one correspondence is the pair of semantically similar entities.

At step 216 of the method 200, the one or more hardware processors 108 select the plurality of optimal one to one correspondence based on the pre-determined threshold. The pre-determined threshold is computed by using the following method steps: (i) receiving the plurality of one to one correspondence, wherein each of the plurality of one to one correspondences is associated with the confidence value (ii) computing the reverse confidence value for each reverse pair of the plurality of one to one correspondences (iii) computing the symmetric difference value between the confidence value and the reverse confidence value associated with each of the plurality of one to one correspondences (iv) generating the plurality of symmetric correspondences pairs based on the computed symmetric difference value, wherein the plurality of one to one correspondence with the difference value less than the predetermined difference value are selected (v) generating the plurality of transitive correspondences based on the plurality of symmetric correspondences and the predetermined difference value (vi) selecting the plurality of threshold correspondences from the plurality of transitive correspondences when the number of transitive correspondences is equal to half of the corresponding reference correspondences (vii) Selecting the highest confidence value from the plurality of threshold correspondences (viii) comparing the confidence value of each of the plurality of threshold correspondences and the highest confidence value to obtain the plurality of final difference values (ix) selecting the plurality of final correspondences based on the corresponding plurality of final difference values, wherein each of the plurality of threshold correspondences with a corresponding final difference value less than or equal to the predetermined difference value are selected and (x) computing the mean value of the plurality of final correspondences to obtain the pre-determined threshold value.

To compute threshold value for a given ontology matching algorithm, the present disclosure utilizes 'Consistency in Confidence Value Computation (CCVC)' property. The present disclosure applies this property on the confidence values to select a subset of correspondences from the alignment set produced by ontology matching algorithm. i.e., correspondences satisfying equation 2. CCVC uses the reference set to prune this subset further by applying equations 3 and 4. Both equations exploit the transitive property of similarity relation (a≡b,b≡c→a≡c) for entities of correspondences using the reference set. Finally, a set of correspondences generated in second step is filtered by applying internal consistency check on the confidence values for every correspondence pair. The CCVC approach is briefly outlined in three steps as below. Step 1: CCVC selects those correspondences that satisfy equation 2 from the set of correspondences. Equation 2 points to important symmetric property of equivalence relation. i.e., a≡b→b≡a. Step 2: CCVC further filters correspondences set generated in the previous step by excluding those correspondences which are not δ-consistent with respect to the reference set. CCVC extends transitive property of equivalence relation to confidence value computation and Step 3: CCVC selects only those correspondences from the set generated in step 2 which are δ-consistent with every other correspondence in their confidence values.

For example, if c and $c_{rs}$ are two correspondences to illustrate how transitive property of similarity relation, as discussed in step 2, is utilized. The correspondences is generated in step 1 and described as <e,e',r,cnf> wherein the correspondence $c_{rs}$ of the reference set "rs" is described as <$e_{rs},e'_{rs},r,cnf_{rs}$>. Transitivity property with respect to the reference set for any correspondence c is captured through the equations 3 and 4. For sake of the readability, $cnf_{rs}$ is represented as $F((e_{rs},e'_{rs}))$.

$$F(e,e'_{rs})-F(e,e_{rs}) \times F(e_{rs},e'_{rs}) < \delta \quad (3)$$

$$F(e',e'_{rs})-F(e',e_{rs}) \times F(e_{rs},e'_{rs}) < \delta \quad (4)$$

For equations 3 and 4, the following cases could be derived:

Case 1: $e=e_{rs}$ and $e'=e'_{rs}$ Since both correspondences c and $c_{rs}$ are equal, they trivially satisfy both the equations 3 and 4.

Case 2: $e \neq e_{rs}$ or $e' \neq e'_{rs}$ or ($e \neq e_{rs}$ and $e' \neq e'_{rs}$)

Second case captures the notion of both correspondences being different in at least one of their entities. In that case, transitivity property for each entity of correspondence c is being captured through reference set correspondence $c_{rs}$. As per reference set, entities $e_{rs}$ and $e'_{rs}$ are similar and that similarity is given in the reference set $F(e_{rs}, e'_{rs}) \equiv cnf_{rs}$. Therefore, the similarity value between entities e of correspondence c and $e'_{rs}$ of a reference set correspondence should be equal to $F(e, e_{rs}) \times F(e_{rs}, e'_{rs}) \equiv cnf_{rs}$. Equation 3 captures equivalence relation between e and $e'_{rs}$. Similar arguments apply for the second entity e' of the correspondence c.

In an embodiment, the algorithm for computing the threshold is explained below.

```
Require: A_SA, RS (Reference Set), δ
Ensure: τ threshold value
 1: align_S1 ← ∅
 2: for all correspondence c ∈ A_SA do
 3:    cnf = OM_similarity (c)
 4:    cnf' = OM_similarity (c')
 5:    if |cnf − cnf'| ≤ δ
 6:       align_s1 ← align_s1 ∪ c
 7:    end if
 8: end for
 9: for all correspondence c ∈ align_s1 do
10:    cnt = 0
11:    for all correspondence c_rs ∈ RS do
12:        <e,e'> = extractEntities(c)
13:        <e_rs,e'_rs> = extractEntities(c_rs)
14:        cnf11 = OM_similarity(e,e_rs)
15:        cnf12 = OM_similarity(e,e'_rs)
16:        cnf21 = OM_similarity(e',e_rst)
17:        cnf22 = OM_similarity(e',e'_rs)
18:        cnf_rs ∈ = extract_similarity(c_rs)
19:        diff_1 = cnf12 − cnf11 X cnf_rs
20:        diff_2 = cnf22 − cnf21 X cnf_rs
21:        if diff_1 ≤ δ and diff_2 ≤ δ then
22:            cnt = cnt + 1
23:        end if
24:    end for
25:    if cnt ≥ (|RS|/2) then // Majority agreement
26:        align_th ← align_th ∪ c
27:    end if
28: end for
29: align_final ← ∅
30: c_max = getCorrespondenceWithMaxCnfValue(align_th)
31: align_final ← align_final ∪ c_max
32: for all correspondence c ∈ align_th do
33:    flag = isCorrepondenceDeltaDistance(c, align_final, δ, cur_th)
34:    if (flag) then
35:        align_final ← align_final ∪ c
36:    end if
37: end for
38: τ = computeMeanValue(align_final)
39: return τ
```

The lines 1-8 of the above-mentioned algorithm iterates through the set generated by step 214 of FIG. 1A and filters those correspondences which satisfy equation 2. The set of correspondences satisfying the equation 2 is collected in another set (lines 5-7). OM_similarity function denotes the similarity function implemented by an input ontology matching algorithm.

The lines 9-28 of the above algorithm iterates over two sets: The first set, denoted as $align_{S1}$ that is generated by step 1 and second set, denoted as RS, that is the reference set RS for a given pair of ontologies. In this step, algorithm first extract entities from the correspondences of $align_{S1}$ and RS (lines 12-13). Algorithm forms four new entity pairs by combining each extracted entity of the correspondence from $align_{S1}$ to every extracted entity of the correspondence from RS and submit those pairs to ontology matching algorithm for confidence values computation (lines 14-17). Subsequently, the confidence value for the reference set correspondence is extracted. After taking absolute difference of respective confidence values, it is determined whether the correspondence of $align_{S1}$ is consistent with the correspondence of RS (lines 19-21). If such a consistency is determined, the correspondence of RS is marked (line 22). The portion of algorithm (lines 19-23) computes and enforces equations 3 and 4. The correspondence of $align_{S1}$ is determined to be consistent in confidence value computation for more than half of RS, that correspondence is included for the threshold value determination (line 26).

The lines 29-39 of the above algorithm implements third step of our approach. The correspondence with maximum confidence value is retrieved from the $align_{th}$ set and included in the $align_{final}$ set (line 30). This ensures that algorithm considers the correspondences which are assigned high confidence values by ontology matching algorithm. For each correspondence from the $align_{th}$ set, its confidence value is checked for the δ-consistency before inclusion in the $align_{final}$ set (lines 33-37). Finally, the mean value of the $align_{final}$ set is returned as the threshold value (lines 38-39).

In an embodiment, the method of generating the plurality of transitive correspondence includes the following steps: (i) extracting the plurality of entities corresponding to each of the plurality of symmetric correspondences (ii) generating the plurality of entity pairs based on the plurality of entities corresponding to each of the plurality of symmetric correspondences and a set of reference entities. The plurality of entity pairs comprises four entity pair (iii) computing the confidence value for each of the plurality of entity pairs by the ontology matching algorithm (iv) computing the first difference value by comparing the confidence value of the second entity pair and the product of confidence value of the first entity pair and a corresponding confidence value of a reference set correspondence (line 19 of the above algorithm) (v) computing a second difference value by comparing the confidence value of a fourth entity pair and the product of confidence value of a third entity pair and the corresponding confidence value of a reference set correspondence (line 20 of the above algorithm) and (vi) selecting a plurality of transitive correspondences based on the first difference value and the second difference value. The plurality of transitive correspondences is selected when the first difference and the second difference are less than or equal to a predetermined difference value.

At step 218 of the method 200, the one or more hardware processors 108 obtain a plurality of semantically similar entities based on the one or more optimal one to one correspondences. An optimal one to one correspondence of a pair of entities from the first ontology and the second ontology are semantically similar.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of automatic computation of threshold based on semantic similarity to identify sensitive information from a document. The computed threshold is utilized for identifying semantically similar information which can be further applied to identify sensitive information in any textual description. The threshold computation is based on a plurality of properties including symmetric property and transitive property.

It is to be understood that the scope of the protection is extended to such a program and in addition to a computer-readable means having a message therein such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
   receiving, by one or more hardware processors, at least one text description comprising a plurality of sentences;
   extracting, by the one or more hardware processors, a plurality of entities and a plurality of relationship between each of the plurality of entities from the plurality of sentences;
   generating, by the one or more hardware processors, an Entity Relationship (ER) model based on the plurality of entities and the plurality of relationship between each of the plurality of entities;
   converting, by the one or more hardware processors, the ER model into a first ontology based on a first set of predefined rules;
   performing a comparison of the first ontology with a second ontology, by the one or more hardware processors, to obtain a plurality of many to many ontology alignments by an ontology matching algorithm, wherein the second ontology is obtained from a relational database based on a second set of predefined rules;
   computing, by the one or more hardware processors, a confidence value for each of the plurality of many to many ontology alignments by the ontology matching algorithm, wherein the ontology matching algorithm exhibits consistency in confidence value computation (CCVC) property if a similarity function F computes same value for every pair of entities $<e_i,e_j>\in O1 \times O2$ and corresponding reverse pair of the entities $<e_j,e_i>$ as $\forall i,j, |F(e_i,e_j)-F(e_j, e_i)|=0, 1\leq i\leq |O1|, 1\leq j\leq |O2|$, wherein O1 and O2 are the pair of ontologies,
   wherein the ontology matching algorithm exhibits CCVC property if the confidence values computed for every pair of entities $<e_i,e_j>\in O1 \times O2$ and corresponding reverse pair of entities $<e_j,e_i>$ by the similarity function F differ at most by a symmetric difference value $\delta$ as $\forall i,j, |F(e_j,e_i)|<\delta, 1\leq i\leq |O1|, 1\leq j\leq |O2|$;
   obtaining, by the one or more hardware processors, a plurality of one to one correspondences based on the plurality of many to many ontology alignments by a linear optimization algorithm, wherein the one to one correspondence is a pair of semantically similar entities; and
   selecting, by the one or more hardware processors, one or more optimal one to one correspondences based on a pre-determined threshold, wherein the pre-determined threshold is computed based on a symmetric property and a transitive property of the entities by:
receiving the plurality of one to one correspondences, wherein each of the plurality of one to one correspondences is associated with a confidence value;
computing a reverse confidence value for each of the plurality of one to one correspondences;
computing a symmetric difference value between the confidence value and the reverse confidence value associated with each of the plurality of one to one correspondences;
generating a plurality of symmetric correspondence pairs based on the computed symmetric difference value;
generating a plurality of transitive correspondence based on the plurality of symmetric correspondences and the predetermined difference value;
selecting a plurality of threshold correspondences from the plurality of transitive correspondences when the number of transitive correspondences is equal to half of corresponding reference confidence value;
comparing the confidence value of each of the plurality of threshold correspondences with a highest confidence value to obtain a plurality of final difference values, wherein the highest confidence value is selected from corresponding confidence values of the plurality of threshold correspondences;
selecting a plurality of final correspondences from the plurality of threshold correspondences based on the corresponding plurality of final difference values; and
computing a mean value of the plurality of final correspondences to obtain the pre-determined threshold; and
obtaining, by the one or more hardware processors, a plurality of semantically similar entities based on the one or more optimal one to one correspondences, wherein an optimal one to one correspondence of a pair of entities from the first ontology and the second ontology are semantically similar.

2. The method of claim 1, wherein the step of generating a plurality of transitive correspondence comprises:
extracting a plurality of entities corresponding to each of the plurality of symmetric correspondences;
generating a plurality of entity pairs based on the plurality of entities corresponding to each of the plurality of symmetric correspondences and a set of reference entities;
computing a confidence value for each of the plurality of entity pairs by the ontology matching algorithm;
computing a first difference value based on the confidence value of a second entity pair, and the confidence value of a first entity pair and a corresponding confidence value of a reference set correspondence;
computing a second difference value based on the confidence value of a fourth entity pair, the confidence value of a third entity pair and the corresponding confidence value of a reference set correspondence; and
selecting a plurality of transitive correspondences based on the first difference value and the second difference value.

3. The method of claim 1, wherein the at least one text description is cleaned for noise and, and wherein each of the plurality of sentences are simplified.

4. The method of claim 1, wherein the plurality of one to one correspondences with the difference value less than a predetermined difference value are selected as the plurality of symmetric correspondence pairs.

5. The method of claim 1, wherein each of the plurality of threshold correspondences with a corresponding final difference value less than or equal to the predetermined difference value are selected as the plurality of final correspondences.

6. The method of claim 2, wherein the plurality of transitive correspondences is selected when the first difference and the second difference are less than or equal to a predetermined difference value.

7. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive at least one text description comprising a plurality of sentences;
extract a plurality of entities and a plurality of relationship between each of the plurality of entities from the plurality of sentences;
generate an Entity Relationship (ER) model based on the plurality of entities and the plurality of relationship between each of the plurality of entities;
convert the ER model into a first ontology based on a first set of predefined rules;
perform a comparison of the first ontology with a second ontology to obtain a plurality of many to many ontology alignments by an ontology matching algorithm, wherein the second ontology is obtained from a relational database based on a second set of predefined rules;
compute a confidence value for each of the plurality of many to many ontology alignments by the ontology matching algorithm, wherein the ontology matching algorithm exhibits consistency in confidence value computation (CCVC) property if a similarity function F computes same value for every pair of entities $<e_i, e_j> \in O1 \times O2$ and corresponding reverse pair of the entities $<e_j, e_i>$ as $\forall i,j, |F(e_i,e_j)-F(e_j,e_i)|=0, 1 \le i \le |O1|, 1 \le j \le |O2|$, wherein O1 and O2 are the pair of ontologies,
wherein the ontology matching algorithm exhibits CCVC property if the confidence values computed for every pair of entities $<e_i,e_j> \in O1 \times O2$ and corresponding reverse pair of entities $<e_j,e_i>$ by the similarity function F differ at most by a symmetric difference value δ as $\forall i,j, |F(e_i,e_j)-F(e_j,e_i)|<\delta, 1 \le i \le |O1|, 1 \le j \le |O2|$;
obtain a plurality of one to one correspondences based on the plurality of many to many ontology alignments by a linear optimization algorithm, wherein the one to one correspondence is a pair of semantically similar entities; and
select one or more optimal one to one correspondences based on a pre-determined threshold, wherein the pre-determined threshold is computed based on a symmetric property and a transitive property of the entities by:
receiving the plurality of one to one correspondences, wherein each of the plurality of one to one correspondences is associated with a confidence value;
computing a reverse confidence value for each of the plurality of one to one correspondences;

computing a symmetric difference value between the confidence value and the reverse confidence value associated with each of the plurality of one to one correspondences;

generating a plurality of symmetric correspondence pairs based on the computed symmetric difference value;

generating a plurality of transitive correspondence based on the plurality of symmetric correspondences and the predetermined difference value;

selecting a plurality of threshold correspondences from the plurality of transitive correspondences when the number of transitive correspondences is equal to half of the corresponding reference confidence value;

comparing the confidence value of each of the plurality of threshold correspondences with a highest confidence value to obtain a plurality of final difference values, wherein the highest confidence value is selected from corresponding confidence values of the plurality of threshold correspondences;

selecting a plurality of final correspondences from the plurality of threshold correspondences based on the corresponding plurality of final difference values; and computing a mean value of the plurality of final correspondences to obtain the pre-determined threshold value; and obtain a plurality of semantically similar entities based on the one or more optimal one to one correspondences, wherein an optimal one to one correspondence of a pair of entities from the first ontology and the second ontology are semantically similar.

8. The system of claim 7, wherein the step of generating a plurality of transitive correspondence comprises:

extracting a plurality of entities corresponding to each of the plurality of symmetric correspondences;

generating a plurality of entity pairs based on the plurality of entities corresponding to each of the plurality of symmetric correspondences and a set of reference entities;

computing a confidence value for each of the plurality of entity pairs by the ontology matching algorithm;

computing a first difference value based on the confidence value of a second entity pair, and the confidence value of a first entity pair and a corresponding confidence value of a reference set correspondence;

computing a second difference value based on the confidence value of a fourth entity pair, the confidence value of a third entity pair and the corresponding confidence value of a reference set correspondence; and selecting a plurality of transitive correspondences based on the first difference value and the second difference value.

9. The system of claim 7, wherein the at least one text description is cleaned for noise and, and wherein each of the plurality of sentences are simplified.

10. The system of claim 7, wherein the plurality of one to one correspondences with the difference value less than a predetermined difference value are selected as the plurality of symmetric correspondence pairs.

11. The system of claim 7, wherein each of the plurality of threshold correspondences with a corresponding final difference value less than or equal to the predetermined difference value are selected as the plurality of final correspondences.

12. The system of claim 8, wherein the plurality of transitive correspondences is selected when the first difference and the second difference are less than or equal to a predetermined difference value.

13. One or more non-transitory machine readable information storage mediums comprising one or more instructions which when executed by one or more hardware processors causes:

receiving, by one or more hardware processors, at least one text description comprising a plurality of sentences;

extracting, by the one or more hardware processors, a plurality of entities and a plurality of relationship between each of the plurality of entities from the plurality of sentences;

generating, by the one or more hardware processors, an Entity Relationship (ER) model based on the plurality of entities and the plurality of relationship between each of the plurality of entities;

converting, by the one or more hardware processors, the ER model into a first ontology based on a first set of predefined rules;

performing a comparison of the first ontology with a second ontology, by the one or more hardware processors, to obtain a plurality of many to many ontology alignments by an ontology matching algorithm, wherein the second ontology is obtained from a relational database based on a second set of predefined rules;

computing, by the one or more hardware processors, a confidence value for each of the plurality of many to many ontology alignments by the ontology matching algorithm, wherein the ontology matching algorithm exhibits consistency in confidence value computation (CCVC) property if a similarity function F computes same value for every pair of entities $<e_i,e_j> \in O1 \times O2$ and corresponding reverse pair of the entities $<e_j,e_i>$ as $\P i,j, |F(e_i,e_j)-F(e_j,e_i)|=0, 1 \le i \le |O1|, 1 \le j \le |O2|$, wherein O1 and O2 are the pair of ontologies, wherein the ontology matching algorithm exhibits CCVC property if the confidence values computed for every pair of entities $<e_i,e_j> \in O1 \times O2$ and corresponding reverse pair of entities $<e_j,e_i>$ by the similarity function F differ at most by a symmetric difference value $\delta$ as $\forall i,j, |F(e_i,e_j)-F(e_j,e_i)|<\delta, 1 \le i \le |O1|, 1 \le j \le |O2|$;

obtaining, by the one or more hardware processors, a plurality of one to one correspondence based on the plurality of many to many ontology alignments by a linear optimization algorithm, wherein the one to one correspondence is a pair of semantically similar entities; and selecting, by the one or more hardware processors, one or more optimal one to one correspondences based on a pre-determined threshold, wherein the pre-determined threshold is computed based on a symmetric property and a transitive property of the entities by:

receiving the plurality of one to one correspondences, wherein each of the plurality of one to one correspondences is associated with a confidence value;

computing a reverse confidence value for each of the plurality of one to one correspondences;

computing a symmetric difference value between the confidence value and the reverse confidence value associated with each of the plurality of one to one correspondences;

generating a plurality of symmetric correspondence pairs based on the computed symmetric difference value;

generating a plurality of transitive correspondence based on the plurality of symmetric correspondences and the predetermined difference value;

selecting a plurality of threshold correspondences from the plurality of transitive correspondences when the number of transitive correspondences is equal to half of the corresponding reference confidence value;

comparing the confidence value of each of the plurality of threshold correspondences with a highest confidence value to obtain a plurality of final difference values, wherein the highest confidence value is selected from corresponding confidence values of the plurality of threshold correspondences;

selecting a plurality of final correspondences from the plurality of threshold correspondences based on the corresponding plurality of final difference values; and computing a mean value of the plurality of final correspondences to obtain the pre-determined threshold value; and obtaining, by the one or more hardware processors, a plurality of semantically similar entities based on the one or more optimal one to one correspondences, wherein an optimal one to one correspondence of a pair of entities from the first ontology and the second ontology are semantically similar.

14. The one or more non-transitory machine readable information storage mediums of claim 13, wherein the step of generating a plurality of transitive correspondence comprises:

extracting a plurality of entities corresponding to each of the plurality of symmetric correspondences;

generating a plurality of entity pairs based on the plurality of entities corresponding to each of the plurality of symmetric correspondences and a set of reference entities;

computing a confidence value for each of the plurality of entity pairs by the ontology matching algorithm;

computing a first difference value based on the confidence value of a second entity pair, and the confidence value of a first entity pair and a corresponding confidence value of a reference set correspondence;

computing a second difference value based on the confidence value of a fourth entity pair, the confidence value of a third entity pair and the corresponding confidence value of a reference set correspondence; and selecting a plurality of transitive correspondences based on the first difference value and the second difference value.

15. The one or more non-transitory machine readable information storage mediums of claim 13, wherein the at least one text description is cleaned for noise and, and wherein each of the plurality of sentences are simplified.

16. The one or more non-transitory machine readable information storage mediums of claim 13, wherein the plurality of one to one correspondence with the difference value less than a predetermined difference value are selected as the plurality of symmetric correspondence pairs.

17. The one or more non-transitory machine readable information storage mediums of claim 13, wherein each of the plurality of threshold correspondences with a corresponding final difference value less than or equal to the predetermined difference value are selected as the plurality of final correspondences.

18. The one or more non-transitory machine readable information storage mediums of claim 14, wherein the plurality of transitive correspondences is selected when the first difference and the second difference are less than or equal to a predetermined difference value.

19. The method of claim 1, wherein the CCVC is applied on the confidence values to select a subset of correspondences from an alignment set produced by the ontology matching algorithm and the CCVC uses a reference set to prune the subset of correspondences, wherein the steps in the CCVC includes: (1) wherein the CCVC selects those correspondences that satisfy symmetric property of equivalence relation. i.e., $a \equiv b \rightarrow b \equiv a$, (2) wherein the CCVC further filters correspondences set generated in (1) by excluding those correspondences which are not $\delta$-consistent with respect to the reference set and the CCVC extends transitive property of equivalence relation to the confidence value computation, and (3) wherein the CCVC selects only those correspondences from the set generated in (2) which are $\delta$-consistent with every other correspondence in their confidence values.

20. The system of claim 7, wherein the CCVC is applied on the confidence values to select a subset of correspondences from an alignment set produced by the ontology matching algorithm and the CCVC uses a reference set to prune the subset of correspondences, wherein the steps in the CCVC includes: (1) wherein the CCVC selects those correspondences that satisfy symmetric property of equivalence relation. i.e., $a \equiv b \rightarrow b \equiv a$, (2) wherein the CCVC further filters correspondences set generated in (1) by excluding those correspondences which are not $\delta$-consistent with respect to the reference set and the CCVC extends transitive property of equivalence relation to the confidence value computation, and (3) wherein the CCVC selects only those correspondences from the set generated in (2) which are $\delta$-consistent with every other correspondence in their confidence values.

* * * * *